United States Patent [19]

Desmonceau et al.

[11] Patent Number: 5,064,894

[45] Date of Patent: Nov. 12, 1991

[54] NON-AGGLOMERATING ELASTOMERIC ORGANOPOLYSILOXANE PARTICULATES PRODUCED BY POLYCONDENSATION CROSSLINKING

[75] Inventors: Daniel Desmonceau, Rillieux La Pape; Rafael Jorda, Sainte Foy Les Lyon, both of France

[73] Assignee: Rhone-Poulenc Chimie, Courbevoie, France

[21] Appl. No.: 467,417

[22] Filed: Jan. 19, 1990

[30] Foreign Application Priority Data

Jan. 19, 1989 [FR] France ............................ 89 00861

[51] Int. Cl.$^5$ ............................................. C08J 7/04
[52] U.S. Cl. ................................... 524/503; 524/837; 524/801; 524/705
[58] Field of Search ............... 524/837, 801, 503, 705

[56] References Cited

U.S. PATENT DOCUMENTS 4,100,124 7/1978 Ichikawa et al. .................... 524/837
4,590,220 5/1986 Bauman et al. ....................... 528/34

FOREIGN PATENT DOCUMENTS 0166397 6/1985 European Pat. Off. .
0277740 1/1988 European Pat. Off. .
0304946 8/1988 European Pat. Off. .

OTHER PUBLICATIONS

The Merck Index, 9th edition; 1976.

*Primary Examiner*—Paul R. Michl
*Assistant Examiner*—Karen A. Hellender
*Attorney, Agent, or Firm*—Burns, Doane, Swecker & Mathis

[57] ABSTRACT

Non-agglomerating elastomeric organopolysiloxane particulates having a mean particle size ranging from 50 μm to 3 mm, uniformly coated with silica powder on the face surfaces thereof and well adapted as a soft filler material for natural or synthetic polymers or as a controlled release dosage form, are produced by (a) forming an oil-in-water emulsion of α,ω-dihydroxydiorganopolysiloxane oils, silica powder, a platinum curing catalyst and, optionally, an active principle such as a medicament or an agrochemical, and then (b) breaking and polycondensation crosslinking such emulsion into the desired particles by heating it to a temperature ranging from 40° to 100° C.

10 Claims, No Drawings

NON-AGGLOMERATING ELASTOMERIC ORGANOPOLYSILOXANE PARTICULATES PRODUCED BY POLYCONDENSATION CROSSLINKING

CROSS-REFERENCE TO COMPANION APPLICATIONS

Copending applications Ser. No. 467,372 and Ser. No. 467,270, both filed concurrently herewith and assigned to the assignee hereof.

BACKGROUND OF THE INVENTION

1. Field of the Invention

The present invention relates to the preparation of non-stick (non-agglomerating) particles based on a crosslinked organopolysiloxane composition, especially elastomer particulates produced by polycondensation crosslinking, which particulates may contain an active principle encapsulated by and/or dispersed within the elastomer.

2. Description of the Prior Art

There is an increasing demand in this art for silicone elastomer particles with a view to their use in two principal types of applications:

(a) incorporation of these particles as filler material into a polymer matrix, in particular into a crosslinkable organopolysiloxane composition to produce an elastomer, with a view especially to an enhancement of flexibility, and (b) conditioning (encapsulation or dispersion) of an active principle by these particles, with a view to the protection and ultimately controlled release thereof.

Among the numerous patents describing processes for the preparation of silicone elastomer particles or microparticles crosslinked by polyaddition and/or polycondensation reactions, the following are particularly representative:

EP-A-252,510, which describes a process comprising mixing the various constituents of a liquid silicone elastomer, which may contain a siliceous filler, at a temperature ranging from $-60°$ C. to $+5°$ C. and then atomizing the mixture in air heated to a temperature of from $+80°$ C. to $200°$ C., in order to produce particles of substantially spherical shape and of a particle size ranging from a few tens of millimicrometers to several hundreds of micrometers;

U.S. Pat. No. 4,248,751, describing a process for the preparation of a silicone latex of polyaddition silicone elastomer particles dispersed in an aqueous phase, which entails polymerizing, in aqueous emulsion, a mixture of vinylated silicone oils, hydrogen-containing silicone oils and a surfactant, and then crosslinking such oils by heating after addition of a platinum catalyst (it is possible to add a colloidal silica to the latex in order to improve the properties of the film-forming elastomer covering obtained after coating of the latex onto a support and evaporation of the water, but this patent neither describes nor suggests the preparation of silicone elastomer particles having a particle size greater than 50 $\mu$m from the latex emulsion);

EP-A-217,257, describing a process for the preparation of silicone particles of a particle size of from 0.01 to 10 mm, including emulsion-polymerizing a diorganocyclopolysiloxane bearing vinyl and mercaptoalkyl groups in the presence of an alkylarylsulfonic acid, breaking the emulsion by adding magnesium sulfate thereto and by heating, introducing a vinyl monomer and effecting a graft polymerization in the presence of a free radical initiator;

U.S. Pat. No. 4,594,134 which describes the preparation of microparticles or spherical particles, of a particle size ranging from 2 to 300 $\mu$m, of silicone polyaddition elastomer, produced by atomization of a platinum-catalyzed composition, including an inhibitor of the platinum, in a dryer at about $230°$ C. The crosslinking can be effected without platinum and under UV irradiation, but with a photosensitizer. Prior to crosslinking, the composition can be dispersed in a liquid medium such as an organic solvent or water;

Japanese Kokai 87/257,939, describing the preparation of a silicone powder by drying and atomization of an aqueous emulsion of a polyaddition silicone composition;

EP-A-267,003, which describes the preparation of microspheres of silicone elastomer by dispersing, in water in the presence of a surfactant, an organopolysiloxane composition which is crosslinkable by addition reactions of the MICHAEL type, and crosslinking of the composition;

U.S. Pat. No. 4,370,160, describing a process similar to EP-A-267,003, except that the organopolysiloxane composition is crosslinked under UV irradiation in the presence of a photosensitizer.

SUMMARY OF THE INVENTION

Accordingly, a major object of the present invention is the provision of improved particulates based on a crosslinked elastomeric organopolysiloxane composition, which improved particulates are directly produced and are storable and easy to handle, and, thus, do not agglomerate.

Another object of the present invention is the provision of a process for the preparation of particles directly from commercially available polycondensation organopolysiloxane compositions.

Still another object of the present invention is the provision of a process for the preparation of particles of the above type, such particles being adapted for easy incorporation, homogeneously, as filler material in a matrix of synthetic or natural polymer, in particular in a silicone elastomer.

Yet another object of this invention is the provision of a process for the preparation of polycondensation silicone elastomer particles, which permits either direct encapsulation, or homogeneous dispersion within the elastomer, of any active principle for purposes of the protection and ultimate controlled release thereof.

Briefly, the present invention features the preparation of non-stick particles having a mean particle size ranging from 50 $\mu$m to 3 mm, based on a crosslinkable organopolysiloxane composition which provides an elastomer by polycondensation reactions, which entails:

(a) preparing an emulsion from:

(A) 100 parts by weight of an $\alpha,\omega$-(dihydroxy)-polydiorganosiloxane;

(B) 0.1 to 20 parts by weight of a crosslinking agent selected from among the organotrialkoxysilanes, the alkyl silicates and the products of the partial hydrolysis thereof;

(C) a catalytically effective amount of a tin catalyst;

(D) an effective amount of a surfactant of the oil-in-water type;

(E) 3 to 100 parts by weight, preferably 5 to 30 parts, of a pyrogenic or precipitated silica powder;
(F) water; and, if appropriate;
(G) an active principle; and
(b) then forming said particles by heating such emulsion to a temperature ranging from 40° to 100° C.

DETAILED DESCRIPTION OF THE PREFERRED EMBODIMENTS OF THE INVENTION

More particularly according to the present invention, in a preferred embodiment thereof, the emulsion contains a volatile organic solvent, the boiling point of which is below 100° C., such as, for example, chloroform ($CHCl_3$).

The use of a volatile organic solvent presents several advantages:
(i) it permits easy emulsification, in water, of the organopolysiloxane composition, even if this latter is a commercial composition in the form of two packages (or components), with or without fillers already incorporated into one of the two packages; and
(ii) during stage (b), the organic solvent evaporates and the aqueous emulsion is then broken, which facilitates formation of the particles.

The active principle (G) can be introduced in a variety of ways into the emulsion:
(1) if the active principle is soluble in the volatile organic solvent, it can be introduced in solution in such solvent;
(2) if the active principle is soluble in water, it is desirable that the water of emulsion be saturated with the active principle (in this manner, the major part of the active principle is homogeneously dispersed within the particles); or
(3) if the active principle (G) is insoluble in water and in the volatile organic solvent, it is introduced in the form of particles dispersed in the organopolysiloxane composition, preferably in the starting silicone oils (A), these microparticles being encapsulated during the stage (b).

After stage (b) has been completed, the particles are filtered off, if desired washed with an alcohol, in particular methanol, then dried in order to eliminate the residual water and to complete, if necessary, the crosslinking of the organopolysiloxane composition.

The dry particles are then screened according to predetermined particle sizes in order to eliminate any excess of silica.

The present invention thus enables the production of particles having a mean particle size ranging from 50 μm to 3 mm, more preferably ranging from 100 μm to 1 mm.

The $\alpha,\omega$-(dihydroxy)-polydiorganosiloxanes (A) must have a viscosity of at least 100 mPa.s at 25° C., preferably at least 10,000 mPa.s Indeed, utilizing viscosities higher than 10,000 mPa.s enables elastomers to be produced which display a pattern of suitable mechanical properties, in particular with respect to Shore A hardness and elongation.

Moreover, the higher the viscosity, the better the mechanical properties are preserved during aging of the elastomer.

The organic radicals of the $\alpha,\omega$-(dihydroxy)-polydiorganopolysiloxanes are monovalent hydrocarbon radicals having up to 6 carbon atoms, which may be substituted by cyano or fluoro groups. The substituents typically present in the industrial polymers, because of their availability, are the methyl, ethyl, propyl, phenyl, vinyl and 3,3,3-trifluoropropyl radicals. In general, at least 80% of the number of these radicals are methyl radicals.

According to this invention, it is more particularly preferred to use $\alpha,\omega$-(dihydroxy)-polydiorganosiloxanes which are already in emulsion and have been prepared by the anionic polymerization process described in the aforementioned U.S. patents, U.S. Pat. No. 2,891,920 and, in particular, U.S. Pat. No. 3,294,725 (hereby incorporated by reference). The polymer produced is stabilized anionically by a surfactant (D) which, according to U.S. Pat. No. 3,294,725, is preferably an alkali metal salt of an aromatic hydrocarbon sulfonic acid, the free acid at the same time serving as the polymerization catalyst.

The preferred catalyst and surfactant are dodecylbenzenesulfonic acid and its alkali metal salts, in particular its sodium salt. If desired, other anionic or nonionic surfactants can be added. Nevertheless, this addition is not necessary because, also according to U.S. Pat. No. 3,294,725, the amount of anionic surfactant resulting from the neutralization of the sulfonic acid is sufficient to stabilize the emulsion of the polymer. This amount is generally less than 3%, preferably 1.5%, by weight of the emulsion.

This emulsion polymerization process is of particular interest because it permits the polymer (A) to be prepared directly in emulsion. Furthermore, this process permits $\alpha,\omega$-(dihydroxy)-polydiorganosiloxane emulsions of very high viscosity to be obtained without difficulty.

To prepare the emulsion, it is equally possible to start from already polymerized $\alpha,\omega$-(dihydroxy)-polydiorganosiloxane and then to emulsify it in water, while stabilizing the emulsions by means of a surfactant selected from among an anionic, cationic, amphoteric and nonionic surfactant, in accordance with a process well known to this art and described in detail in the literature (see, for example, the FR-A-2,064,563, FR-A-2,094,322, FR-A-2,114,230 and EP-A-169,098).

According to this process, the $\alpha,\omega$-(dihydroxy)-polydiorganosiloxane polymers are mixed by simple agitation with the surfactant, it being possible for the latter to be in aqueous solution. Water is then added, if necessary, and the entire mass is converted into a fine and homogeneous emulsion by passing it through a conventional colloid mill.

The resulting ground material is then diluted with an appropriate amount of water, thus providing an emulsion stabilized by a surfactant (for storage stability).

The preferred anionic surfactants are the alkali metal alkylbenzenesulfonates, alkali metal alkyl-sulfates (or ethoxylated alkylarylsulfates) and alkali metal dioctylsulfosuccinates.

The preferred cationic surfactants are the quaternary ammonium chlorides and polyethoxylated quaternary ammonium salts.

The preferred nonionic surfactants are the polyethoxylated fatty acids, sorbitan esters, polyethoxylated sorbitan esters and polyethoxylated alkylphenols.

In general, 1 to 30 parts by weight, preferably 2 to 10 parts, of surfactant (D) are used per 100 parts by weight of the total amount of the organopolysiloxane polymers (A) and (B).

A more particularly suitable surfactant is polyvinyl alcohol. This is a solid granular product which can still contain acetate groups. Generally, its percentage of hydrolysis is high, exceeding 85%. For example, RHODOVIOL ® 25/140 from RHONE-POULENC or ELVANOL ® 50-42 from DUPONT can be used. Typically, 1 to 20 parts by weight, preferably 2 to 10 parts, of polyvinyl alcohol are used per 100 parts by weight of the total amount of the organopolysiloxane polymers (A) and (B).

The crosslinking agent (B) is selected from among the organotrialkoxysilanes such as, for example, vinyltrimethoxysilane, alkyl silicates such as methyl silicate or ethyl silicate, or partial hydrolysis products thereof, namely, alkyl polysilicates such as methyl polysilicate and ethyl polysilicate.

The organotrialkoxysilanes and the alkyl silicates preferably have the general formula:

in which R is an alkyl radical having from 1 to 4 carbon atoms, R' is R or vinyl and a is 1 or 0.

The constituent (C) is a catalytic tin compound, advantageously an organotin salt, preferably introduced in the form of an aqueous emulsion. The organotin salts which can be used are described in particular in the Noll text, *Chemistry and Technology of Silicones*, page 337, Academic Press (1968).

Also exemplary of such catalytic tin compounds is the reaction product of a tin salt, in particular a diorganotin dicarboxylate, with ethyl polysilicate, as described in U.S. Pat. No. 3,862,919.

It is also possible to use the reaction product of an alkyl silicate or an alkyltrialkoxysilane with dibutyltin diacetate, as described in Belgian Patent BE-A-842,305.

The preferred tin salts are tin bis-chelates (EP-A-147,323 and EP-A-235,049), diorganotin dicarboxylates and in particular dibutyl- or dioctyltin diversatates (British Patent GB-A-1,289,900, dibutyl- or dioctyltin diacetate and dibutyl- or dioctyltin dilaurate. 0.01 to 3 parts by weight, and preferably 0.05 to 2 parts, of organotin salt are used per 100 parts by weight of (A).

The silicas (E) include the pyrogenic silicas and precipitated silicas.

They have a specific surface area, measured according to the BET method, of at least 50 m$^2$/g, preferably more than 70 m$^2$/g, a mean size of the primary particles of less than 80 nanometers and a bulk density of less than 200 g/liter.

These silicas can be incorporated as such or after having been treated with organosilicon compounds conventionally used for this application. These compounds include methylpolysiloxanes, such as hexamethyldisiloxane and octamethylcyclotetrasiloxane, methylpolysilazanes, such as hexamethyldisilazane, and hexamethylcyclotrisilazane, chlorosilanes, such as dimethyldichlorosilane, trimethylchlorosilane, methylvinyldichlorosilane and dimethylvinylchlorosilane, and alkoxysilanes, such as dimethyldimethoxysilane, dimethylvinylethoxysilane and trimethylmethoxysilane. During this treatment, the silicas can increase their initial weight by up to an amount of 20%, preferably approximately 18%.

The particles produced by the process of the invention, which may or may not contain an active principle (G), are more particularly useful as a filler material in matrices of natural or synthetic polymers, in particular in natural or synthetic rubbers and silicone elastomers.

The particles prepared by the process of the invention can be used for embedding, encapsulating or dispersing any active principles or active agents, such as, in particular, adhesives, catalysts, colorants, hardeners, detergents, pharmaceutical products, enzymes, perfumes, nutrients, fuels, inks, insecticides, metals, medicaments, monomers, odorizing agents, oils, pheromones, plasticizers, propellants, solvents, solid substrates containing an absorbed active constituent, and vitamins in an elastomer matrix.

The emulsions according to the invention can be prepared by conventional methods of emulsifying organopolysiloxane polymers.

For example, the surfactant (D) and the silica powder (E) can be mixed with water at a temperature ranging from ambient temperature to 80.C until a homogeneous mixture is obtained. The organopolysiloxane (A), which may already be in the form of an aqueous emulsion, and the crosslinking agent (B) are then added to the mixture under continuous vigorous agitation, always at a temperature ranging from 25° to 80° C., in order to form an emulsion. The organopolysiloxanes (A) and the crosslinking agent (B) can have been dissolved beforehand in an organic solvent.

The tin catalyst (C) and the active principle (G) are then added.

If the active principle (G) is soluble in water and insoluble in the volatile organic solvent, it can be introduced into the original water for the emulsion, preferably up to saturation.

If the active principle (G) is soluble in the volatile organic solvent and insoluble in water, it can be introduced into the solution of the polyorganosiloxanes (A) and (B) in the volatile organic solvent.

If the active principal (G) is insoluble in water and in the volatile organic solvent, it can be introduced in the form of microparticles and dispersed in the organopolysiloxane composition before the latter is emulsified, preferably only in the starting material oil (A). This latter mode of introducing (G) can, of course, be used whatever the solubility of (G) in water and in the volatile organic solvent.

The emulsion is then heated to a temperature (below 100° C.) and for a period of time suitable for the formation of solid particles.

The solution is then cooled to ambient temperature, and the particles are isolated by centrifuging or by filtration through a polyester fabric and washed several times with water in order to eliminate the surfactant and the silica.

After washing with an alcohol, if necessary, preferably methanol, it can be advantageous to mix the particles obtained with silica powder in order to perfect their non-stick property, and then to screen the particles to eliminate the excess silica powder.

Quite surprisingly and unexpectedly, the present invention made it possible to establish that the silica grains are concentrated at the surface of the particles, thus conferring on the latter their non-stick character. The particles are in the form of a powder, the various grains of which do not agglomerate with one another.

In order to further illustrate the present invention and the advantages thereof, the following specific examples are given, it being understood that same are intended only as illustrative and in nowise limitative.

In said examples to follow, as well as in the above description, all parts and percentages are given by weight unless otherwise indicated.

EXAMPLE 1

An aqueous solution containing:

(i) 600 g of distilled water;
(ii) 2.5 g of RHODOVIOL® 25/140 surfactant, marketed by the RHONE-POULENC; and
(iii) 3.5 g of precipitated silica having a specific BET surface area of 160 m²/g, was prepared.

30 g of an organopolysiloxane composition dissolved in 13 g of CHCl₃, such organopolysiloxane composition having been formulated by mixing:

(iv) 740 parts of an α,ω-(dihydroxy)-polydimethylsiloxane oil having a viscosity of 15,000 mPa.s at 25° C.;
(v) 220 parts of diatomaceous silica;
(vi) 22 parts of n-propyl silicate; and
(vii) 8 parts of stannous octoate, were run into the above aqueous solution under vigorous agitation in order to form an emulsion.

The temperature was maintained for 30 minutes at 25° C. under very vigorous agitation (1,350 rpm).

The temperature of the water was gradually increased to 50° C. and maintained thereat for 1 hour. The solution was then cooled to 25° C., and the particles obtained were filtered off through a 70 μm mesh polyester fabric and washed once with water, in order to eliminate the surfactant and the silica.

These particles were recovered and then placed under a vacuum for 3 hours at 125° C. They were then screened in order to eliminate the excess silica and fractionated in accordance with particle size.

The mass yield was 85%.

By passage through a screen, the following distribution of the particle diameter $\phi$ of the particles was determined:

200 μm<$\phi$<500 μm:72% by weight,

500 μm <$\phi$<1,000 μm:28% by weight.

COMPARATIVE EXAMPLE 2

The procedure of Example 1 was repeated exactly, but with the exception that the 3.5 g of precipitated silica were not introduced.

This produced sticking particles which were agglomerated and consequently were useless.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

We claim:

1. An oil-in-water emulsion polycondensation crosslinkable into non-stick elastomeric organopolysiloxane particulates having a mean particle size ranging from 50 μm to 3 mm, comprising:

(A) 100 parts by weight of an α,-dihydroxydiorganopolysiloxane;
   (B) 0.1 to 20 parts by weight of a crosslinking agent selected from among an organotrialkoxysilane, an alkyl silicate, or a partial hydrolysis product thereof;
   (C) a catalytically effective amount of a tin curing catalyst;
   (D) an effective amount of an oil-in-water surfactant;
   (E) 3 to 100 parts by weight of a pyrogenic or precipitated silica powder which, upon heating of the emulsion to a temperature below 100° C. and for a period of time suitable for the formation of solid particles, concentrates at a surface of said particles to confer on said particles a non-stick character; and
   (F) water.

2. The oil-in-water emulsion as defined by claim 1, further comprising a volatile organic solvent having a boiling point of less than 100° C.

3. The oil-in-water emulsion as defined by claim 2, said volatile organic solvent comprising chloroform.

4. The oil-in-water emulsion as defined by claim 1, further comprising (G) at least one active principle.

5. The oil-in-water emulsion as defined by claim 1, said α,ω-dihydroxydiorganopolysiloxane having a viscosity of at least 100 mPa.s at 25° C.

6. The oil-in-water emulsion as defined by claim 5, said α,ω-dihydroxydiorganopolysiloxane (A) having a viscosity of at least 10,000 mPa.s at 25° C.

7. The oil-in-water emulsion as defined by claim 1, said surfactant comprising a polyvinyl alcohol.

8. The oil-in-water emulsion as defined by claim 1, said silica powder (E) having a specific surface area of at least 50 m²/g, a mean primary particle size of less than 80 nanometers and a bulk density of less than 200 g/liter.

9. The oil-in-water emulsion as defined by claim 4, said active principle (G) comprising an adhesive, catalyst, colorant, hardener, detergent, pharmaceutical, enzyme, perfume, nutrient, fuel, ink, insecticide, metal, medicament, monomer, odorizing agent, oil, pheromone, plasticizer, propellant, solvent, solid substrate which comprises an absorbed active agent, or a vitamin dispersed in an elastomeric matrix.

10. The oil-in-water emulsion as defined by claim 4, comprising microfine particles of said active principle (G).

* * * * *